United States Patent
Long et al.

(10) Patent No.: US 10,328,795 B2
(45) Date of Patent: Jun. 25, 2019

(54) HYDRAULIC STACK AUXILIARY DRIVE ASSEMBLY

(71) Applicant: Deere & Company, Moline, IL (US)

(72) Inventors: Randall L. Long, Coffeyville, KS (US); G. William Detrick, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 174 days.

(21) Appl. No.: 15/443,725

(22) Filed: Feb. 27, 2017

(65) Prior Publication Data
US 2018/0244150 A1   Aug. 30, 2018

(51) Int. Cl.
| | | |
|---|---|---|
| *B60K 17/28* | (2006.01) | |
| *B60K 6/00* | (2006.01) | |
| *F15B 11/08* | (2006.01) | |
| *F16H 7/02* | (2006.01) | |
| *B60K 17/10* | (2006.01) | |
| *B60K 17/34* | (2006.01) | |
| *B60K 17/356* | (2006.01) | |
| *A01D 46/08* | (2006.01) | |

(52) U.S. Cl.
CPC ............... *B60K 17/28* (2013.01); *B60K 6/00* (2013.01); *B60K 17/105* (2013.01); *B60K 17/34* (2013.01); *B60K 17/356* (2013.01); *F15B 11/08* (2013.01); *F16H 7/02* (2013.01); *A01D 46/08* (2013.01); *F15B 2211/20576* (2013.01)

(58) Field of Classification Search
CPC ....................................................... B60K 17/28
See application file for complete search history.

(56) References Cited

U.S. PATENT DOCUMENTS

| | | | | |
|---|---|---|---|---|
| 4,542,801 A | * | 9/1985 | Richards | B60K 17/28 180/235 |
| 6,581,706 B2 | * | 6/2003 | Bordini | B60K 6/365 180/65.235 |
| 7,597,172 B1 | * | 10/2009 | Kovach | F16H 47/02 180/305 |
| 8,360,931 B2 | * | 1/2013 | Keeney | B60K 17/28 180/165 |
| 8,556,005 B2 | * | 10/2013 | Ozawa | B66F 9/07572 180/53.1 |
| 8,567,538 B2 | * | 10/2013 | Hancock, Sr. | B60K 25/00 180/53.1 |

(Continued)

*Primary Examiner* — Nicole T Verley
(74) *Attorney, Agent, or Firm* — Klintworth & Rozenblat IP LLP (57) ABSTRACT

An auxiliary drive assembly includes a mounting structure configured to mount a first hydraulic drive component in a fixed position with respect to a second hydraulic drive component along a drive axis. A first shaft coupled to the first hydraulic drive component is configured to rotate with respect to the drive axis. A second shaft coupled to the second hydraulic drive component is configured to rotate with respect to the drive axis. A power takeoff device is arranged along the drive axis between the first and second hydraulic drive components and coupled to the first and second shafts for co-rotation with respect to the drive axis. The power takeoff device is configured to transfer rotational power from the power source as received from the first hydraulic drive component to an auxiliary component of the work vehicle.

20 Claims, 5 Drawing Sheets

(56) References Cited

U.S. PATENT DOCUMENTS

| | | | | |
|---|---|---|---|---|
| 8,660,724 B2* | 2/2014 | Tarasinski | ................ | B60K 6/48 180/65.21 |
| 8,668,467 B2* | 3/2014 | Douglas | ................ | F04B 35/045 417/223 |
| 8,997,914 B2* | 4/2015 | Umemoto | ............... | A01D 69/03 180/307 |
| 9,038,753 B2* | 5/2015 | Hancock, Sr. | ......... | B60K 25/02 180/53.1 |
| 9,194,473 B1* | 11/2015 | Hauser | ................... | B60K 17/28 |
| 9,551,269 B2* | 1/2017 | Mizoguchi | .............. | F16D 65/78 |
| 9,707,843 B2* | 7/2017 | Petersen | ................ | B60K 17/28 |

* cited by examiner

HYDRAULIC STACK AUXILIARY DRIVE ASSEMBLY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and drive assemblies for various auxiliary components of work vehicles.

BACKGROUND OF THE DISCLOSURE

In large-scale work vehicles, a power source (e.g., an internal combustion engine) may provide power to various subsidiary power systems that drive certain components of the work vehicle. For example, mechanical input power from an engine may be delivered to electric and/or hydraulic systems of the work vehicle. In various wheeled or tracked work vehicles, for example, electric and/or hydraulic power may propel the work vehicle, power the vehicle steering system, and operate any of numerous auxiliary components onboard the work vehicle (e.g., the cooling system), including various work implements (e.g., booms, harvesting heads, etc.). Arranging the drive assemblies for all of the various electrically and/or hydraulically driven components in modern work vehicles such that they all are able to tie into the power source, while still delivering adequate power to the associated components, may be challenging.

SUMMARY OF THE DISCLOSURE

A drive assembly for delivering power to auxiliary components of a work vehicle is disclosed in which a power takeoff device receives power from the engine through mechanical coupling to one or more hydraulic pumps coupled to the engine.

According to one aspect, the disclosure provides an auxiliary drive assembly for a work vehicle having a power train including a power source having a drive shaft rotating about a rotation axis and having a hydraulic drive arrangement powered by the power source. The hydraulic drive arrangement has a first hydraulic drive component for powering a first component of the work vehicle and has a second hydraulic drive component for powering a second component of the work vehicle. The first and second hydraulic drive components are arranged along a drive axis that extends at an angle to the rotation axis of the drive shaft. The auxiliary drive assembly includes a mounting structure configured to mount the first hydraulic drive component in a fixed position with respect to the second hydraulic drive component along the drive axis. A first coupler is coupled to the first hydraulic drive component and configured to rotate with respect to the drive axis. A second coupler is coupled to the second hydraulic drive component and configured to rotate with respect to the drive axis. A power takeoff device is arranged along the drive axis between the first and second hydraulic drive components and coupled to the first and second couplers for co-rotation with respect to the drive axis. The power takeoff device is configured to transfer rotational power from the power source as received from the first hydraulic drive component to an auxiliary component of the work vehicle.

Another aspect of the disclosure provides a drive arrangement for a work vehicle having a power source with a drive shaft rotating about a rotation axis. The drive arrangement includes a hydraulic drive arrangement and an auxiliary drive assembly. The hydraulic drive arrangement is powered by the power source, and it has a first hydraulic drive component for powering a first component of the work vehicle and a second hydraulic drive component for powering a second component of the work vehicle. The first and second hydraulic drive components are arranged along a drive axis that extends at an angle to the rotation axis of the drive shaft. The auxiliary drive assembly includes a first shaft coupled to the first hydraulic drive component and driven to rotate with respect to the drive axis, a second shaft coupled to the second hydraulic drive component and driven to rotate with respect to the drive axis, and a power takeoff device arranged along the drive axis between the first and second hydraulic drive components and coupled to the first and second shafts for co-rotation with respect to the drive axis. The power takeoff device is configured to transfer rotational power from the power source as received from the first hydraulic drive component to an auxiliary component of the work vehicle.

Yet another aspect of the disclosure provides a work vehicle. The work vehicle includes a power source having a drive shaft rotating about a rotation axis, a hydraulic drive arrangement powered by the power source, an auxiliary drive assembly, and an auxiliary component driven by the auxiliary drive assembly. The hydraulic drive arrangement has a first hydraulic drive component for powering a first component of the work vehicle and having a second hydraulic drive component for powering a second component of the work vehicle. The first and second hydraulic drive components being arranged along a drive axis that extends at an angle to the rotation axis of the drive shaft. The auxiliary drive assembly includes a first shaft coupled to the first hydraulic drive component and driven to rotate with respect to the drive axis by the first hydraulic drive component, a second shaft coupled to the second hydraulic drive component and driven to rotate with respect to the drive axis by the second hydraulic drive component; and a power takeoff device arranged along the drive axis between the first and second hydraulic drive components and coupled to the first and second shafts for co-rotation with respect to the drive axis. The auxiliary component is coupled to the power takeoff device, and the auxiliary drive assembly is configured to receive rotational power from the power source transferred through the first hydraulic drive component and transmit, at least in part, the received rotational power to the auxiliary component.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed auxiliary drive assembly, as shown in the accompanying figures of the drawings described briefly above. Various modifications to the example embodiments may be contemplated by one of skill in the art.

As used herein, the "axial" direction may refer to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally parallel with the rotational axis of the shaft.

Also as used herein, "radially" aligned may refer to two components that are both disposed along a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned although one or both of the components may not be cylindrical (or otherwise radially symmetric). For example, a rotating shaft may be "radially" aligned with a rectangular housing containing the shaft over a length of the shaft that axially overlaps with the housing.

Modern work vehicles, such as those used in the agriculture, construction, forestry, mining and other industries, may have numerous auxiliary work devices and implements that are driven by subsidiary systems (e.g., electric and/or hydraulic systems) onboard the machine, and ultimately powered by a power source (e.g., internal combustion engine, electric storage devices, fuel cell, and so on) that also drives propulsion of the vehicle. Packaging the power source and the auxiliary systems, along with numerous other components of the machine (e.g., cooling, driveline, emission control and various other components) in a manner that provides proper power coupling to the various systems and components, and to do so within the space constraints of the engine or other auxiliary compartments of the machine, may be difficult. Further, machine performance or functionality may benefit from, or even require, that certain of the machine components be mounted to the machine in certain orientations. For example, mounting the power source in an in-line orientation (i.e., such that the drive shaft is aligned or parallel with the vehicle centerline in the direction of travel) with a side-mounting cooling system (e.g., cooling fan) may provide certain operational advantages (e.g., proper cooling of the engine with improved chassis design and engine serviceability). This further complicates the packaging and power coupling of auxiliary systems.

This disclosure addresses one or more of the aforementioned issues by providing a means to couple and drive auxiliary components via a drive component stack, such as a conventional hydraulic pump stack, without requiring significant add-on components that further tighten the space envelope and complicate component packaging in the machine. The disclosure provides an auxiliary drive arrangement in which a compact power takeoff device is interposed between consecutive pump components. The power takeoff device receives rotational power from the power source via one of the pumps to which it is coupled and transmits, at least in part, the received rotational power to another pump. In certain embodiments, the disclosed auxiliary drive arrangement may include a mounting arrangement for coupling the pumps, a power takeoff device, and a pair of couplers for joining the power takeoff device with the pumps in such a way to impart and transmit rotational power between the pumps.

In various embodiments, the power takeoff device may be any component suitably configured to transmit rotational power to one or more auxiliary components. For example, the power takeoff device may include a rotating power transmission component in the form of a sheave, pulley, sprocket and the like that couples to, and drives, an endless power transmission member, such as a belt, chain and the like. It will be under stood that the term "endless" as used herein incorporates segmented, seamed and seamless loop members. Also, multiple endless members may be incorporated into the auxiliary drive arrangement to be driven by multiple rotating components, or a single rotating component with multiple engagement features, one for each of the endless members. The endless member(s) transmit rotational power from the rotating component(s) by mating with one or more additional rotating components of the auxiliary component(s). Friction or traction features (e.g., teeth, splines, prongs, tapers, etc. on the rotating component and splines, ribs, openings, tapers, etc. on the endless members) may be included in the rotating components and endless members to aid in transmitting rotational power.

In various embodiments, the coupling features may provide for direct or indirect rotational coupling of the power takeoff device with rotational components (e.g., shafts, shaft receivers, rotors, etc.) of the mating pumps. The couplers may be stub shafts with mounting flanges that are connected (e.g., via bolts or other mechanical fasteners) directly to the rotating power transmission component. As one example, the mounting flange of one shaft may be mounted to an inner axial side or face of a sheave, and the mounting flange of the other shaft may be mounted to an outer axial side of the sheave such that a direct (or 1:1 ratio) power coupling is established between the two pumps via the two shafts and the sheave.

As another example, two shafts may be coupled to inner and outer axial sides or faces of two different sheaves that themselves are coupled together to transfer rotational power. In this case, the two sheaves may be coupled to provide a 1:1 ratio, or to provide a speed/torque reduction or increase via an intermediate gear arrangement. Speed/torque reduction may also be achieved in multiple endless member arrangements by sizing the mating features of a single rotating component or multiple rotating components differently (e.g., sheaves having different diameters). Providing different speed/torque ratios at the auxiliary drive arrangement may avoid the need for or to supplement downstream gear reduction or increasing components (e.g., at each auxiliary component) when powering multiple auxiliary components that operate at different speed/torque values.

The auxiliary drive arrangement may couple the cooperating pumps via a mounting arrangement that fixes and aligns the pumps in a spaced-apart relationship along a drive axis about which rotate the rotating elements of the power takeoff device and pumps. For example, one pump may mount directly to the power source (e.g., engine) to fix its relative position and align it along the drive axis. The mounting arrangement may then mount to that pump and to the next pump in the stack, thereby fixing the position of that pump along the drive axis. Further, the mounting arrangement may provide an axial gap between the two pumps. In some embodiments, the mounting arrangement may provide a fully or partially enclosed or covered housing for the rotating components and couplers of the auxiliary drive arrangement to reduce or prevent dirt and debris from contacting these components.

In various embodiments, the mounting arrangement may provide a partially enclosed housing for the power takeoff device. The housing may take the form of a multi-part assembly having two primary housing parts (e.g., that are bolted together) that generally cover or enclose the inner and outer axial faces of one or more rotating components (e.g., sheaves and the like). The two housing parts define one or more openings or windows for viewing and servicing the auxiliary drive arrangement as well as to permit the endless member(s) to couple to the rotating component(s). The opening or openings may be sized to allow or prevent the rotating component from passing through them for assembly or disassembly. In the latter case, the housing assembly may include a removable part, such as a spanner element bolted to the housing parts, that spans the gap between the housing parts. Depending on the configuration of the opening or openings and the size and count of the endless members, a particular endless member may pass into the housing on the same or opposite sides of the spanner.

In this (and other) embodiments, the auxiliary drive arrangement permits assembly and disassembly of the rotating component for various purposes, including initial installation, repair/cleaning, or to change the size or type of the component, without requiring the pumps to be dismounted or even have their mountings loosened or adjusted. The disclosed arrangement may also provide for assembly and disassembly of the couplers without displacing the pumps or adjusting their mountings.

Figure 1:
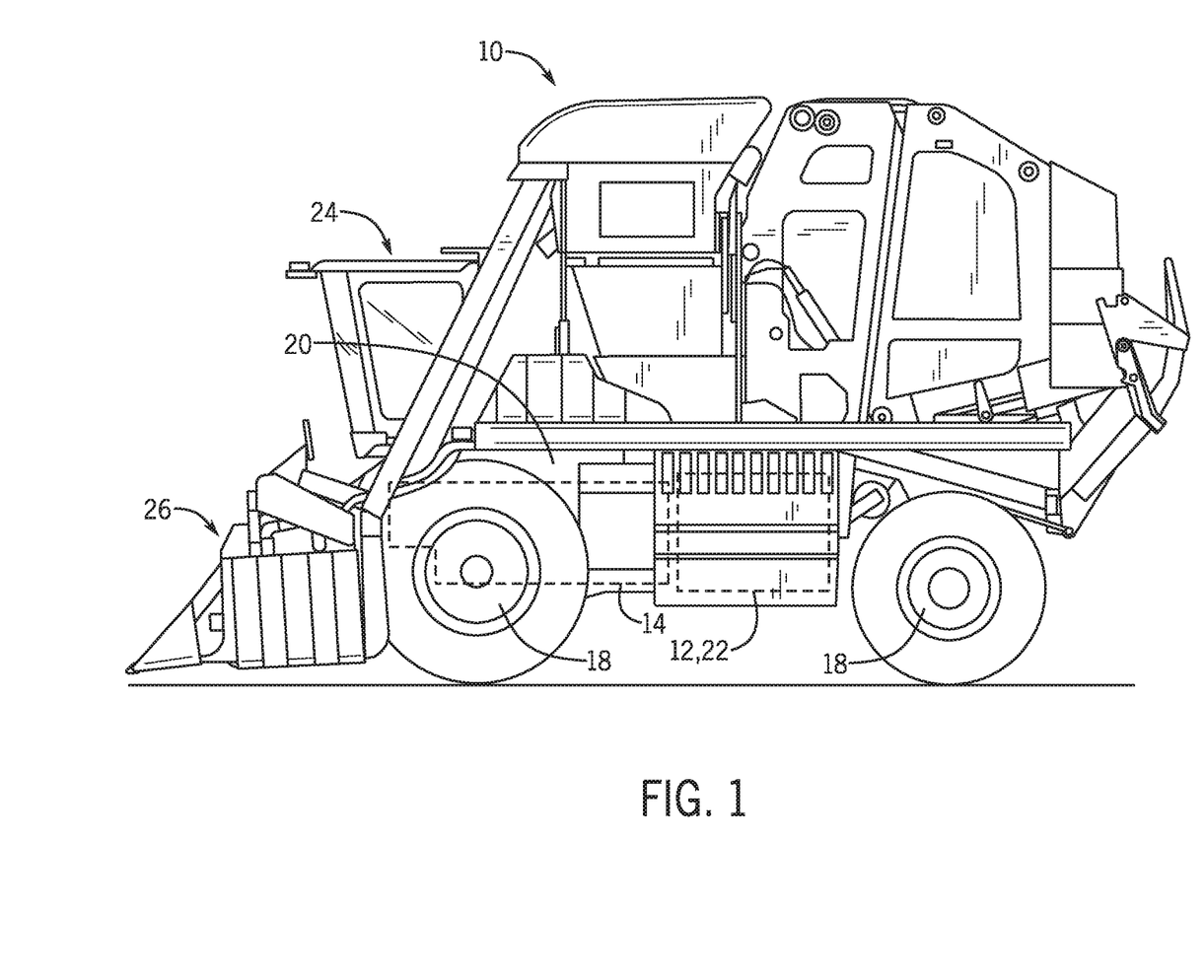
FIG. 1 is side view of an example work vehicle in the form of a cotton harvesting machine with which an auxiliary drive assembly according to this disclosure may be implemented.

As will become apparent from the discussion herein, the disclosed auxiliary drive arrangement may be used advantageously in a variety of work machines, including in cotton processing machinery (e.g., a cotton picker and cotton stripper vehicles), referred to herein as a "cotton harvester." As mentioned, however, the disclosed arrangement may be used advantageously with a wide variety of work vehicles in various industries, such that the described example in the cotton machine context should not be limiting. With reference to FIG. 1, an example cotton harvester 10 is depicted with a power source 12 (e.g., an internal combustion engine, fuel cell, battery pack, etc.), a transmission 14 (with various gears, shafts, clutches/brakes, etc.) coupled to the power source 12 by a drive shaft 16 that rotates about a rotation axis R to drive the rest of the driveline (including various axles, transaxles, differentials, steering control devices and so on) to transmit power from the power source 12 to a set of powered wheels 18 (and controlling steering thereof) mounted to a chassis 20 for moving the cotton harvester 10 over a field. The power source 12 is cooled by a cooling system, including a cooling fan 22. The cotton harvester 10 may also have an operator cabin 24 supported by the chassis 20 at a forward end of the vehicle containing various operator controls for controlling various transport and work functions of the cotton harvester 10. The cotton harvester 10 may include various other electric and hydraulic sub-systems, including hydraulic pumps and accumulators, electrohydraulic control valves, and associated plumbing and electrical lines or buses. One or more controllers (with associated processing and memory architecture) may be used to control various aspects of the power source 12 and various subsystems for propulsion and work-performing components under the direction of the operator and/or automating control logic.

The cotton harvester chassis 20 is also configured to support a set of forward harvesting (or "row") units 26 for gathering cotton. As understood, the harvesting units 26 include various drums with spindles, which rotate during operation to pull fiber (and seed) from cotton plants as the cotton harvester 20 traverses the cotton field. Cotton gathered by the harvesting units 26 may be moved (e.g., by air pressure through a duct arrangement) into the body of the cotton harvester 10 for further processing (e.g., for forming into modules). The harvesting units 26 may receive operating power from the power source 12 via the transmission 14 or a dedicated drive assembly may be utilized to communicate power from the transmission 14 to the harvesting units 26.

The cotton harvester 10 may also include various cotton-processing subsystems that may include any of various types of conveyance devices or mechanisms suitable to move cotton bolls and fibers. For example, one or more rollers, tracks, belts and conveyors may be used. One or more motive devices, such as suitable electric or hydraulic motors, may be used to drive rotation or other movement of the conveyance devices. The one or more motors may be coupled operatively to a single one conveyance device of each subsystem. If a subsystem includes multiple conveyance devices the additional devices may either be directly coupled to, and driven by, the one or more motors, or they be coupled to the conveyance device driven by the one or motors and driven actively or passively by the motor-driven conveyance device. For example, a common electric or hydraulic motor having an output shaft may be connected to a drive gear or sprocket coupled to the conveyance devices. A roller may be coupled operatively to a drive gear or sprocket using a direct or indirect connection, such as various intermediate gears, belt or chain drives, pulley systems, etc. Gear or sprocket enlargements or reductions may be used to achieve a desired speed and torque for each subsystem.

Figure 2:
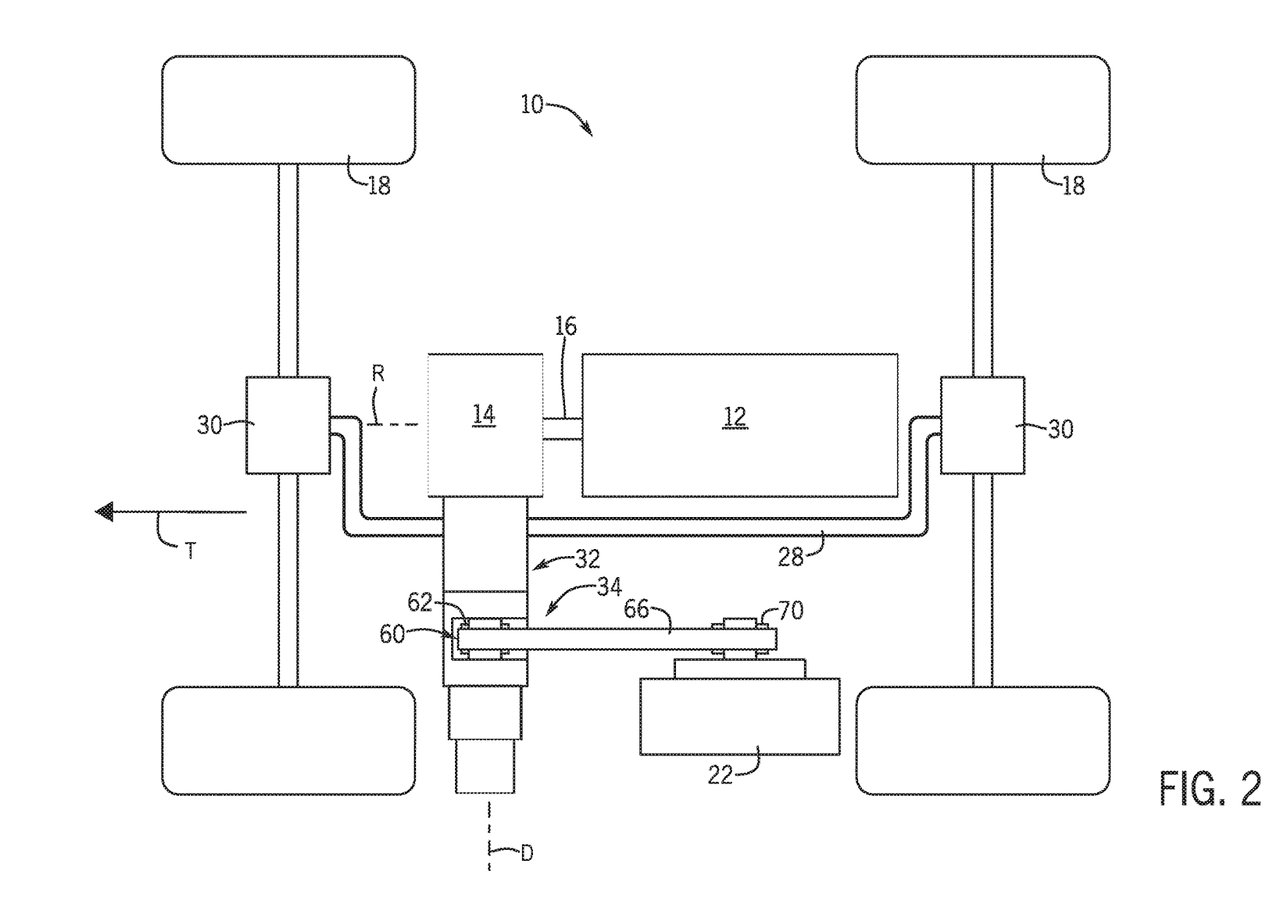
FIG. 2 is a schematic view of a simplified power train of the work vehicle of FIG. 1 incorporating the auxiliary drive assembly according to this disclosure.

FIG. 2 of the drawings depicts a simplified schematic view of the cotton harvester 10 in which the power source 12 is in an in-line orientation with its long dimension generally aligned with a fore-aft direction of travel of the cotton harvester 10. The power source 12 powers the hydraulic system 28 (depicted as a hydraulic line), which powers the drive wheels 18, the speed and torque thereto being delivered and adjusted by the transmission 14 and transaxles 30. Power is delivered to various auxiliary devices, subsystems or implements via a set of hydraulic pumps, collectively the pump stack 32. To couple the pump stack 32 to an auxiliary system or component, in this case to the cooling fan 22, a power takeoff arrangement 34 is disposed within the pump stack 32.

Figure 3:
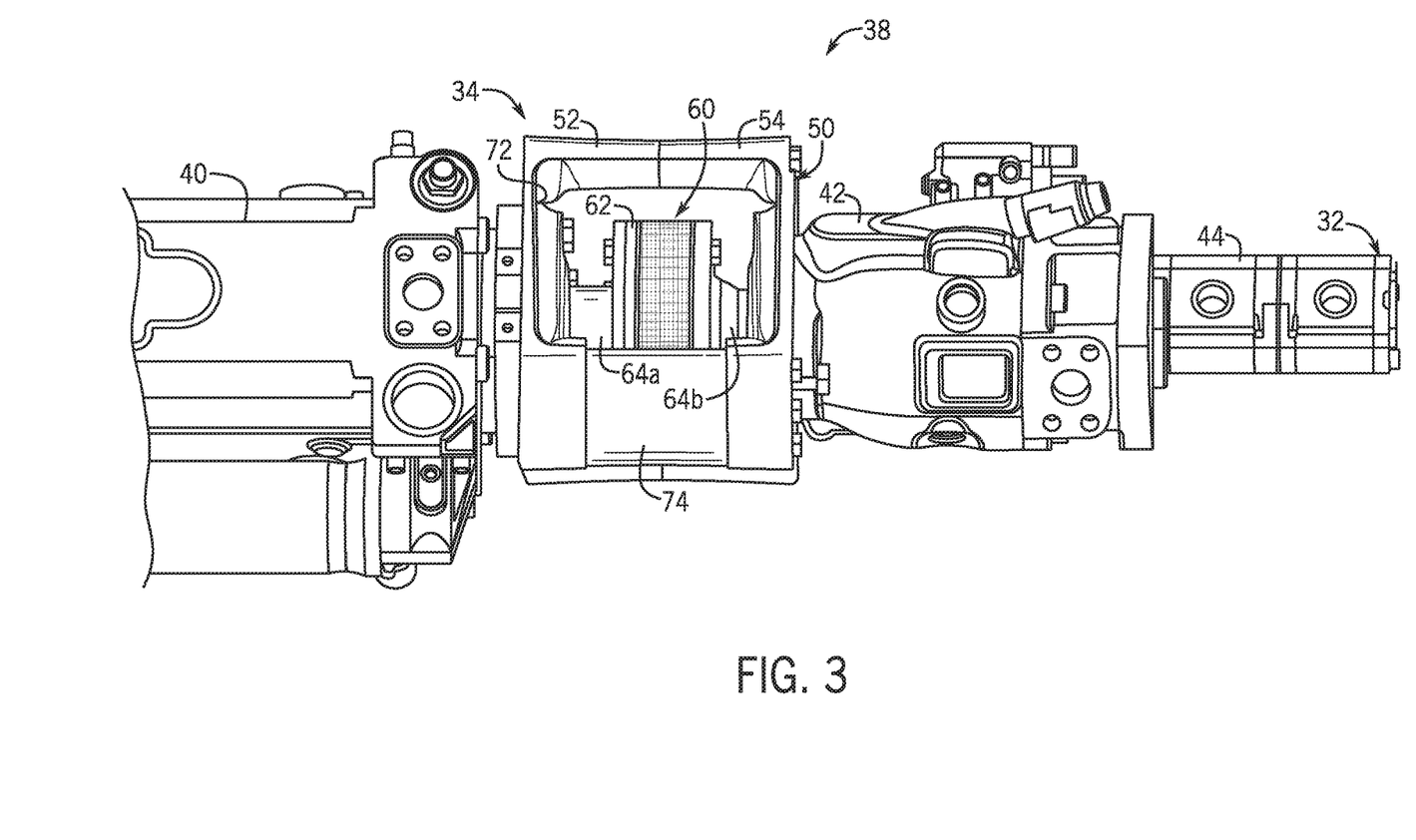
FIG. 3 is a partial side view of an example auxiliary drive assembly according to this disclose.
Figure 4:
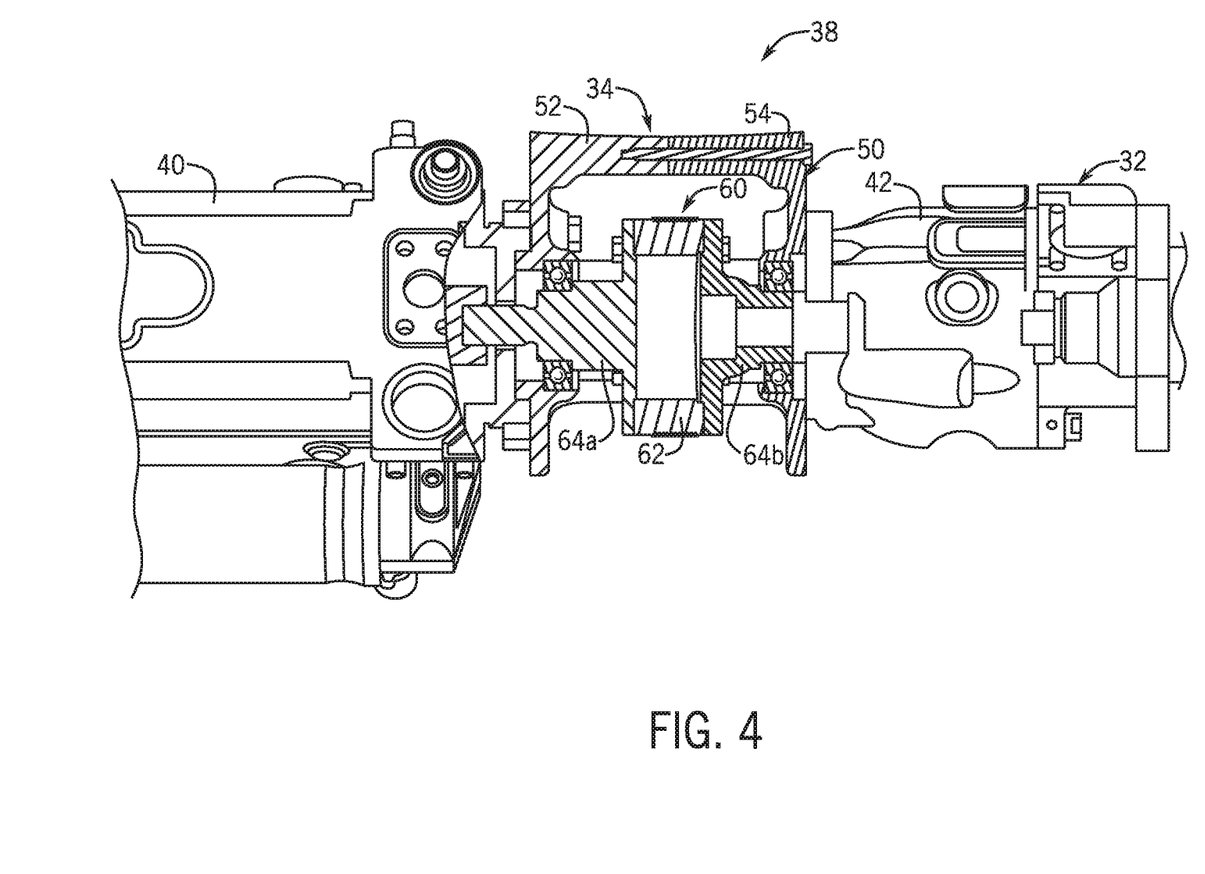
FIG. 4 is a view similar to FIG. 3 partially cut-away to show various components of the example auxiliary drive assembly in section.
Figure 5:
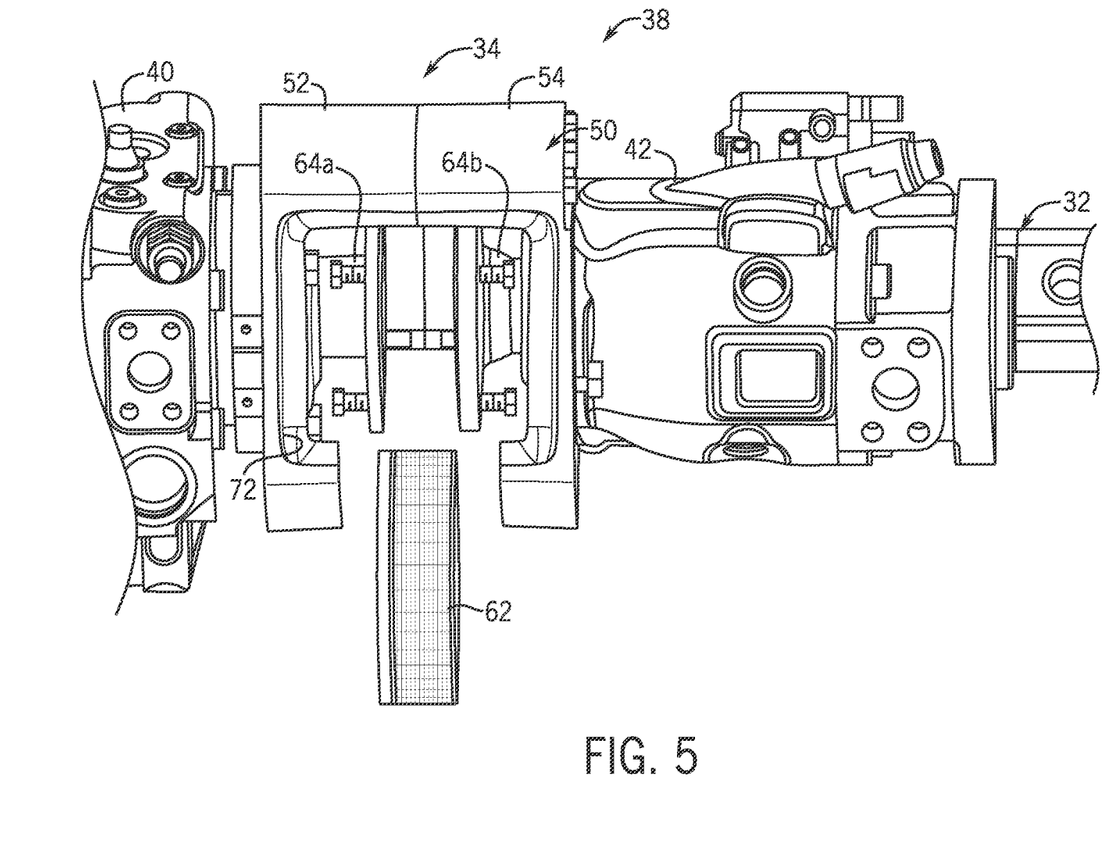
FIG. 5 is a view similar to FIG. 3 showing removal of a power takeoff device.

Referring now to FIGS. 3-5, a particular example of an auxiliary drive arrangement 38 that includes the pump stack 32 and the power takeoff arrangement 34 will be described in detail. As shown, the example pump stack 32 includes three hydraulic pumps, namely, a first pump 40, a second pump 42 and a third pump 44. By way of example only, the first pump 40 is a propel pump for driving the front and rear transaxles 30 and thereby the wheels 18. The second pump 42 is a power steering pump for driving associated steering components (not shown). The third pump 44 is a feeder harvesting pump for driving certain components of the cotton conveyance system (also not shown). As can be seen, the example pumps 40, 42, 44 are configured differently, being suited to power their respective components and with their capacities and sizes decreasing from the first pump 40 to the third pump 44.

The example power takeoff arrangement 34 is interposed between the first 40 and second 42 pumps in the illustrated example. This could differ, however, depending on various factors. For instance, in the illustrated example, the power takeoff arrangement 34 is driving the cooling fan 22, which requires a pump capacity that is higher than the second 42 and third 44 pumps. Other components requiring less power (e.g., a water pump, an air-conditioning pump, a secondary alternator and the like) could be driven by a power takeoff arrangement interposed between the second 42 and third 44 (or other) pumps. Such a power takeoff arrangement may be configured the same as the power takeoff arrangement 34, or be configured differently (e.g., of smaller size), and may be in addition to, or instead of, the power takeoff arrangement 34. It is also possible for a power takeoff arrangement to be mounted to the end of the outermost pump (e.g., the third pump 44). Thus, the pump stack may include one or more of the same or different power takeoff arrangements located between any suitable pair of pumps or at the end of the outermost pump such that a given power takeoff arrangement may be part of a power flow path from the power source 12 that includes a single pump only, multiple pumps only, or one or more other power takeoff arrangements in combination with either a single pump or multiple pumps.

The first pump 40, and thereby the pump stack 32, is fixed with respect to the chassis 20, for example, being mounted (e.g., bolted) directly to the power source 12. Further, the pump stack 32 extends along a drive axis D that is generally orthogonal to the travel direction T along which the power source 12, and the drive shaft 16 and its rotation axis R, are aligned. One or more pumps and the power take off arrangement may be positioned with rotating parts aligned coaxially with the drive axis D, or arranged along one or more axes offset from the drive axis D. Reference herein to certain components being arranged "along" or rotating "about" or "with respect to" an axis includes either or both of actually coaxial and offset axis layouts. Thus, pump stacks having a different count, configuration, orientation, or axis layout of pumps is within the purview of this disclosure.

The power takeoff arrangement 34 may form part of the structure tying the pump stack 32 together and to the vehicle chassis 20 (or the transmission 14 or the power source 12). For example, the power takeoff arrangement 34 may include a mounting arrangement 50 having one or more parts that are mounted directly or indirectly to one or more components of the pump stack 32, such as parts 52 and 54 mounted (e.g. bolted) together and to respective first 40 and second 42 pumps, as shown. The mounting arrangement 50, and parts 52, 54, may have various configurations and may act as an enclosure, cover or housing for one or more parts of the power takeoff arrangement 34, such as a power takeoff device 60.

Like other parts of the auxiliary drive arrangement 38, the power takeoff device 60 may include components that take various configurations for transmitting rotational power within or from the pump stack 32. The example power takeoff device 60 is an assembly of components including a rotating component 62 mounted in-line with the rotational power flow of the pump stack 32. In the illustrated example in which the power takeoff arrangement 34 is interposed between the first 40 and second 42 pumps, the rotating component 62 of the power takeoff device 60 is mounted to rotating power output and power input components (e.g., shafts, rotors, etc. (not shown)) of the first 40 and second 42 pumps, respectively. The rotating component 62 may be a monolithic (i.e., one-piece) component or an assembly of parts, and it may be coupled to the adjoining input/output components of the pump stack 32 directly or indirectly. In the illustrated example, the rotating component 62 takes the form of a grooved sheave or pulley. Other power transmitting configurations (e.g., pulley, sprocket and the like) are also possible. The rotating component 62 in this example is fixed to the rotating input/output components of the pump stack 32 by two couplers 64a, 64b, which themselves may have various forms, including the stub shaft configurations illustrated. As further shown, one coupler 64a connects (e.g., bolts) to the output component of the first pump 40 and to one axial face (with respect to the drive axis D) of the rotating component 62, and the other coupler 64b connects to the opposite axial face and the input component of the second pump 42.

The rotating component 62 transfers rotational power to an endless member 66, which may be considered either part of the power takeoff device 60 or to be a separate component. The endless member 66 may have a straight, curved or tapered cross-sectional profile and be sized to mate with the rotating component 62 sufficient to transmit rotational power from the rotating component 62 to the endless member 66 (e.g., having a diameter sized to fit within the sheave groove). In other embodiments, and depending on the configuration of the rotating component, the endless member may be a belt, chain or the like. As noted above, the endless member 66 may be a seamless or seamed loop member or consist of multiple segments or links. As also noted, these two components of the power takeoff device 60 could be any of various other configurations, for example, including multiple endless members driven by multiple rotating components, or a single rotating component with multiple engagement features, one for each of multiple endless members. Friction or traction features (e.g., teeth, splines, prongs, tapers, etc. on the rotating component and splines, ribs, openings, tapers, etc. on the endless members) may be included in the rotating components and endless members to aid in transmitting rotational power.

The endless member(s) transmit rotational power from the rotating component(s) by mating with one or more additional rotating components of the auxiliary component(s). In the illustrated example, this takes the form of another sheave rotating component 70 (see FIG. 2) (or corresponding component) that cooperates (i.e., engages) with the endless member 66 to transmit rotational power to the auxiliary component, here the cooling fan 22. One or more openings, such as opening 72, in or formed by the parts 52, 54 of the mounting arrangement 50 allow space for the endless member 66 (i.e., the two revolving legs or segments thereof) to extend about both of the rotating components 62, 70. The opening(s) of the mounting arrangement 50 also permit access to, and visual inspection of, the power takeoff device 60, especially the rotating component 62 and its engagement with the endless member 66.

The opening(s) may also permit access to the rotating component 62 for cleaning, repair or replacement with a like or differently configured rotating component. By using removable connections in the power flow path, in other words a separate removable connection or connections between the rotating component and the pump(s) (i.e., at the connections of the couplers 64a, 64b to the rotating component 62 and/or to the input/output components of the pumps 40, 42), the power take device 60 may be disassembled from the mounting arrangement 50 and the pump stack 32 with some or all of the mounting arrangement 50 intact, and thus without disassembling one or more of the pumps from the pump stack 32 or the pump stack 32 from the chassis 20 or transmission 14 or the power source 12. In the illustrated example, as shown in FIG. 5, the mounting arrangement 50 has the opening 72 through which the sheave and the endless member may be removed from the pump stack 32 after being disconnected from the couplers 64a, 64b, again with the pump stack 32 otherwise remaining intact. In various embodiments, the mounting arrangement 50 may include one or more removable structural or shielding components, such as a structural spanner element 74, which may be removably connected (e.g., bolted) to, and thereby span the axial gap between, the parts 52, 54 of the mounting arrangement 50. This has the effect of dividing the opening 72 into two smaller openings, which, while possibly being too small for the rotating component to pass through, allow the revolving legs or segments of the endless member 66 to pass between the rotating components 62, 70 through openings at each side of the spanner element 74.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. In a work vehicle having a power train including a power source having a drive shaft rotating about a rotation axis and having a hydraulic drive arrangement powered by the power source, the hydraulic drive arrangement having a first hydraulic drive component for powering a first component of the work vehicle and having a second hydraulic drive component for powering a second component of the work vehicle, the first and second hydraulic drive components being arranged along a drive axis that extends at an angle to the rotation axis of the drive shaft, an auxiliary drive assembly comprising:
    a mounting structure configured to mount the first hydraulic drive component in a fixed position with respect to the second hydraulic drive component along the drive axis;
    a first coupler coupled to the first hydraulic drive component and configured to rotate with respect to the drive axis;
    a second coupler coupled to the second hydraulic drive component and configured to rotate with respect to the drive axis; and
    a power takeoff device arranged along the drive axis between the first and second hydraulic drive components and coupled to the first and second couplers for co-rotation with respect to the drive axis, the power takeoff device being configured to transfer rotational power from the power source as received from the first hydraulic drive component to an auxiliary component of the work vehicle.

2. The auxiliary drive assembly of claim 1, wherein the first and second hydraulic drive components are hydraulic pumps.

3. The auxiliary drive assembly of claim 1, wherein the power takeoff device includes an endless power transmission member.

4. The auxiliary drive assembly of claim 3, wherein the power takeoff device includes at least one of a sheave and a sprocket arranged along the drive axis between the first and second couplers configured to engage the endless power transmission member for co-rotation.

5. The auxiliary drive assembly of claim 4, wherein the mounting structure is a housing containing, at least in part, the first and second couplers and the power takeoff device, the housing being mounted to the first and second hydraulic drive components.

6. The auxiliary drive assembly of claim 5, wherein the housing has at least one exterior opening through which the power takeoff device is removable from the hydraulic drive arrangement.

7. The auxiliary drive assembly of claim 6, wherein the housing includes a spanner extending across the exterior opening from a first axial end of the housing to a second axial end of the housing; and
    wherein the endless power transmission member extends through the exterior opening on opposite sides of the spanner.

8. The auxiliary drive assembly of claim 7, wherein the spanner is removably mounted to the housing, and, when the spanner is removed, the power takeoff device may be removed from the hydraulic drive arrangement through the exterior opening.

9. A drive arrangement for a work vehicle having a power source with a drive shaft rotating about a rotation axis, the drive arrangement comprising;
    a hydraulic drive arrangement powered by the power source, the hydraulic drive arrangement having a first hydraulic drive component for powering a first component of the work vehicle and having a second hydraulic drive component for powering a second component of the work vehicle, the first and second hydraulic drive components being arranged along a drive axis that extends at an angle to the rotation axis of the drive shaft; and
    an auxiliary drive assembly including a first shaft coupled to the first hydraulic drive component and driven to rotate with respect to the drive axis, a second shaft coupled to the second hydraulic drive component and driven to rotate with respect to the drive axis, and a power takeoff device arranged along the drive axis between the first and second hydraulic drive components and coupled to the first and second shafts for co-rotation with respect to the drive axis, the power takeoff device being configured to transfer rotational power from the power source as received from the first hydraulic drive component to an auxiliary component of the work vehicle.

10. The drive arrangement of claim 9, wherein the first and second hydraulic drive components are hydraulic pumps.

11. The drive arrangement of claim 9, wherein the power takeoff device includes an endless power transmission member and at least one of a sheave and a sprocket arranged along the drive axis between the first and second shafts configured to engage the endless power transmission member for co-rotation.

12. The drive arrangement of claim 11, wherein the auxiliary drive assembly includes a housing containing, at least in part, the first and second shafts and the power takeoff device, the housing being mounted to the first and second hydraulic drive components.

13. The drive arrangement of claim 12, wherein the housing has at least one exterior opening through which the power takeoff is removable from the hydraulic drive arrangement.

14. The drive arrangement of claim 13, wherein the housing includes a spanner extending across the exterior opening from a first axial end of the housing to a second axial end of the housing; and
    wherein legs of the endless member extend through the exterior opening on opposite side of the spanner; and
    wherein the spanner is removably mounted to the housing, and, when the spanner is removed, the power takeoff device may be removed from the hydraulic drive arrangement through the exterior opening.

15. A work vehicle, comprising:
    a power source having a drive shaft rotating about a rotation axis;
    a hydraulic drive arrangement powered by the power source, the hydraulic drive arrangement having a first hydraulic drive component for powering a first component of the work vehicle and having a second hydraulic drive component for powering a second component of the work vehicle, the first and second hydraulic drive components being arranged along a drive axis that extends at an angle to the rotation axis of the drive shaft;
    an auxiliary drive assembly including a first shaft coupled to the first hydraulic drive component and driven to rotate with respect to the drive axis, a second shaft coupled to the second hydraulic drive component and driven to rotate with respect to the drive axis, and a power takeoff device arranged along the drive axis between the first and second hydraulic drive components and coupled to the first and second shafts for co-rotation with respect to the drive axis; and
    an auxiliary component coupled to the power takeoff device;
    wherein the auxiliary drive assembly is configured to receive rotational power from the power source transferred through the first hydraulic drive component and, at least in part, transmit the received rotational power to the auxiliary component.

16. The work vehicle of claim 15, wherein the first and second hydraulic drive components are hydraulic pumps.

17. The work vehicle of claim 16, wherein the power takeoff device includes an endless power transmission member and at least one of a sheave and a sprocket arranged along the drive axis between the first and second shafts configured to engage the endless power transmission member for co-rotation.

18. The work vehicle of claim 17, wherein the auxiliary drive assembly includes a housing containing, at least in part, the first and second shafts and the power takeoff device, the housing being mounted to the first and second hydraulic drive components.

19. The work vehicle of claim 18, wherein the housing has at least one exterior opening through which the power takeoff device is removable from the hydraulic drive arrangement.

20. The work vehicle of claim 19, wherein the housing includes a spanner extending across the exterior opening from a first axial end of the housing to a second axial end of the housing; and
    wherein legs of the endless member extend through the exterior opening on opposite side of the spanner; and
    wherein the spanner is removably mounted to the housing, and, when the spanner is removed, the power takeoff device may be removed from the hydraulic drive arrangement through the exterior opening.

* * * * *